INVENTORS: H. SCHONHORN
L. H. SHARPE

United States Patent Office 3,380,879
Patented Apr. 30, 1968

3,380,879
METHOD OF FORMING A SEAL DIRECTLY BETWEEN AN UNMODIFIED FLUOROCARBON POLYMER SURFACE AND AN EPOXY ADHESIVE, AND ARTICLE MADE THEREBY
Harold Schonhorn, New Providence, and Louis H. Sharpe, Morris Township, Morris County, N.J., assignors to Bell Telephone Laboratories, Incorporated, New York, N.Y., a corporation of New York
Filed Mar. 16, 1964, Ser. No. 352,191
13 Claims. (Cl. 161—184)

ABSTRACT OF THE DISCLOSURE

Fluorocarbon polymers may be bonded with epoxy adhesives in the absence of any preliminary surface treatment of the fluorocarbon by positioning the adhesive thereon and maintaining the assembly at temperatures ranging from 20–200° C.

---

This invention relates to a technique for bonding halogenated polymers to adhesive compositions. More particularly, the present invention relates to a technique for bonding fluorocarbon polymers to epoxy adhesives.

It has generally been accepted in the adhesives industry that fluorocarbon polymers cannot be structurally bonded with any of the commercially available epoxy adhesives in the absence of a preliminary surface modification of the polymer. Unfortunately, such modification involves defluorination of the polymer surface, typically with dispersions of metallic sodium in liquid ammonia, tetrahydrofuran or naphthalene, so resulting in the formation of a carbonaceous residue upon the polymer surface and the alteration of the electrical properties of the polymer.

In accordance with the present invention, a technique is described for bonding fluorocarbon polymers with epoxy adhesives wherein a suitable epoxy adhesive is positioned upon the untreated surface of a selected fluorocarbon polymer and the resultant assembly maintained at a temperature within the range of 20–220° C. for a time period within the range of ½ to 24 hours. The resultant structures evidence tensile shear strengths at 23° C. as high as 4000 pounds per square inch and higher, such exceeding the strength of the polymer and being appreciably greater than those evidenced by any of the prior art structures.

It will be understood by those skilled in the art that the main impact of the present invention lies in the fact that the deleterious preliminary treatment of the polymer surface is avoided, thereby permitting for the first time the direct bonding of fluorocarbons to conventional epoxy adhesives, and additionally, bonding is attained at temperatures appreciably below the melting point of the polymer.

Figure 1:
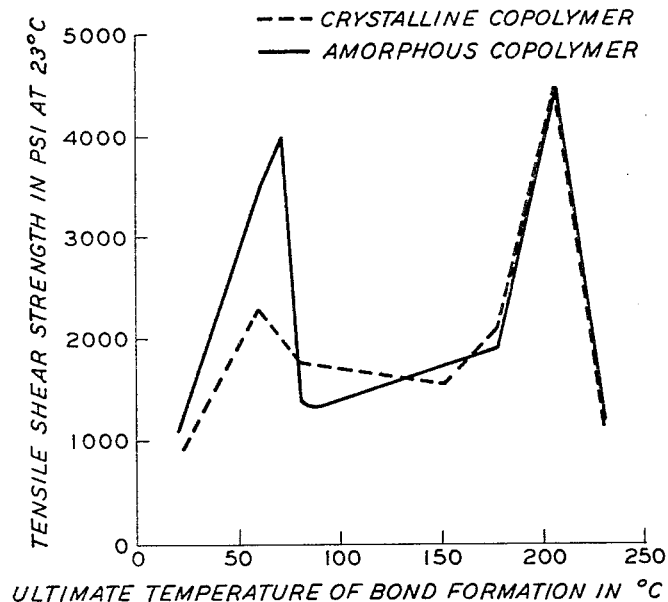
Figure 2:
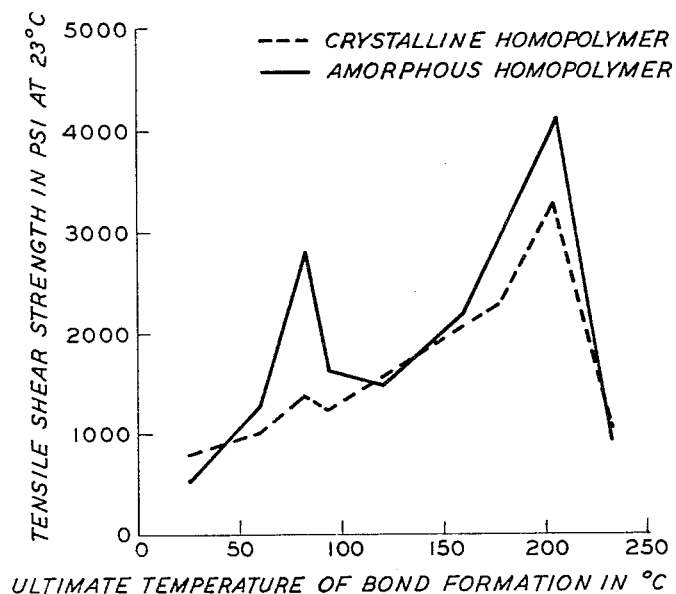

The invention will be more readily understood by reference to the accompanying drawing wherein:

FIG. 1 is a graphical representation on coordinates of tensile shear strength at 23° C. in pounds per square inch against ultimate temperature of bond formation in degrees centigrade showing the tensile shear strengths of joints of epoxy adhesive-fluorocarbon copolymer-epoxy adhesive composites fabricated in accordance with the present invention; and FIG. 2 is a graphical representation on coordinates of tensile shear strength at 23° C. in pounds per square inch against ultimate temperature of bond formation in degrees centigrade showing the tensile shear strengths of joints of epoxy adhesive-fluorocarbon homopolymer-epoxy adhesive composites fabricated in accordance with the present invention.

A general outline of the methods herein described and the ranges of operating parameters will now be given.

The fluorocarbon polymers employed in the practice of this invention may be selected from among (a) homopolymers of trifluorochloroethylene, (b) copolymers of trifluorochloroethylene with vinylidene fluoride, and (c) terpolymers of trifluorochloroethylene, vinylidene fluoride and tetrafluoroethylene.

The epoxy adhesive employed in the practice of the present invention may be selected from among any of the commercially available materials. However, in order to obtain low temperature maximum strengths as described below the adhesive must evidence a surface tension less than 35 dynes/cm. In order to utilize materials evidencing surface tensions beyond the noted maximum, a surfactant may be employed to reduce the surface tension to an acceptable value. A particularly useful adhesive for the practice of the invention comprises a mixture of the diglycidyl ether of bisphenol A and diethylaminopropylamine.

The inventive process involves preparing an epoxy adhesive in accordance with conventional techniques and thereafter uniformly coating the surface of a sheet of a fluorocarbon polymer selected from the above-described systems therewith. Following, the coated polymer is maintained at a temperature within the range of 20–220° C. for a time period within the range of ½ to 24 hours, the lower temperatures corresponding with the longer time periods, thereby forming a structural joint between the fluorocarbon and the adhesive having a tensile shear strength appreciably greater than prior art structures of the described type. It has been determined that in the copolymer system maximum tensile shear strengths may be obtained at temperatures within the range of 50–80° C., a preferred range being 52–74° C. (for epoxy adhesives capable of being cured within these ranges). In the case of the homopolymer system, maximum bond strengths are obtained at temperatures within the range of 60–92° C., a preferred range being 72–88° C. (for epoxy adhesives capable of being cured within these ranges). In each case, it is significant to note that the maxima occur at temperatures appreciably below the melting point of the fluorocarbons.

Additionally, it has been determined that even greater bond strengths may be obtained by continued heating, a maximum for the described systems being attained at temperatures within the range of 180–220° C. Although in certain instances it may be desirable to continue heating until this second maxima is attained, it is considered particularly significant that the first maxima could be attained at the noted temperatures.

It has been theorized that the first maxima occurs as a result of the low surface tension of the epoxy adhesive (less than 35 dynes/cm.) and the theorized occurrence of microflow in the surface region of the polymer.

Several examples of the present invention are described in detail below. These examples are included merely to aid in the understanding of the invention, and variations may be made by one skilled in the art without departing from the spirit and scope of the invention.

Example I

An epoxy resin, diglycidyl ether of bisphenol A was selected for use in preparing an epoxy adhesive. The resin, obtained from commercial sources, evidenced an epoxy equivalent weight of 179, a total chloride content less than 0.1 percent by weight and a viscosity of 6400 centipoises, at 25° C.

Diethylaminopropylamine, obtained from commercial sources, was distilled under nitrogen through a 6 inch Vigreux column and the first fraction discarded. The product, distilling at 68° C. and 26 mm. pressure, was stored in a dark container prior to use.

An epoxy adhesive was prepared by mixing 100 parts by weight of the above-described resin with 7 parts by weight of the diethylaminopropylamine. The mixture was thoroughly stirred until uniform and applied immediately to the untreated surfaces of an 0.005 inch thick sheet of crystalline and amorphous copolymers of chlorotrifluoroethylene with vinylidene fluoride. The resultant assembly was maintained at a temperature of 70° C. for approximately 16 hours.

In order to determine tensile shear strengths of the resultant structures, composites were prepared in accordance with the following procedure:

Metal tensile shear adherends, 5 x 1 x 1/16 inch, of 2024–T3 aluminum obtained from commercial sources were selected. The surface of the aluminum adherends was prepared by vapor degreasing in trichloroethylene in accordance with conventional procedures and, subsequently, etching for 7 minutes at 65° C. in a solution comprising 1 part by weight sodium dichromate, 30 parts by weight water and 10 parts by weight of 95% sulfuric acid. Following etching, the adherends were rinsed for 5 minutes in running tap water, for one minute in running distilled water and then dried in a forced air oven at 60° C. The adherends were stored in desiccators and removed just prior to use.

For the measurement of tensile shear strengths, composite test pieces comprising aluminum-epoxy adhesive-fluorocarbon-epoxy adhesive-aluminum were prepared for bonding in a device designed to maintain a ½ inch overlap, the thickness of the epoxy adhesive being maintained constant by insertion of a piece of 0.003 inch diameter gold wire in each glue line between the aluminum and the fluorocarbon. Bonding of the aluminum to the epoxy adhesive-fluorocarbon structure was effected at a pressure of 20 pounds per square inch by placing the composites in forced air ovens maintained at 70° C. for 16 hours. The bonded structures were tested in accordance with ASTM D1002–53T, except that the strain rate was 0.1 inch per minute. The tensile shear strength of the crystalline copolymer structure was approximately 2150 pounds per square inch at 23° C. and the amorphous copolymer approximately 4000 pounds per square inch at 23° C.

Example II

The procedure of Example I was repeated with the exception that the fluorocarbon was the homopolymer of trifluorochloroethylene in both the amorphous and crystalline form. The assemblies were heated to temperatures of approximately 85° C. The tensile shear strength of the crystalline homopolymer structure was approximately 1240 pounds per square inch at 23° C. and the amorphous homopolymer approximately 2600 pounds per square inch at 23° C.

Example III

The procedure of Examples I and II was repeated over the entire temperature range of 20–220° C. in order to obtain tensile shear data for the copolymer and homopolymer systems.

With reference now more particularly to FIG. 1, there is shown a graphical representation on coordinates of ultimate temperature of bond formation in ° C. against tensile shear strength in pounds per square inch at 23° C. showing variations in tensile shear strength as a function of bonding temperature for composites of epoxy adhesive-crystalline or amorphous copolymer of trifluorochloroethylene with vinylidene fluoride-epoxy adhesive-aluminum.

It is noted that two distinct maxima in joint strength are observed in the case of both the crystalline and amorphous materials. It is of particular interest to note that the first maxima occurs well below the melting point of the polymer.

After attaining a maximum low temperature joint strength there is a sharp decrease which is occasioned by the more rapid cure of the adhesive at the higher temperature. After the adhesive is fully cured there exist two solid surfaces and the joint strength remains fairly constant until the melting point of the polymers is approached at which time it increases rapidly, reaches a high temperature maximum and again falls off due to degradation of the epoxy adhesive.

FIG. 2 is a graphical representation on coordinates of ultimate temperature of bond formation in ° C. against tensile shear strength in pounds per square inch at 23° C. showing variations in tensile shear strengths as a function of bonding temperatures for composites of epoxy adhesive-crystalline or amorphous homopolymer of trifluorochloroethylene-epoxy adhesive-aluminum. It is to be noted that the curves of FIG. 2 are substantially similar to those of FIG. 1, the reasons for the noted maxima being described above.

While the invention has been described in detail in the foregoing specification and the drawing similarly illustrates the same, the aforesaid is by way of illustration only and it not restrictive in character. It will be appreciated that although the invention has been described largely in terms of the use of a diglycidyl ether of bisphenol A-diethylaminopropylamine system, any commercially available epoxy system may be employed. The several modifications which will readily suggest themselves to persons skilled in the art are all considered within the scope of this invention, reference being had to the appended claims.

What is claimed is:

1. The method of forming a seal directly between a fluorocarbon polymer having an unmodified surface and an epoxy adhesive, the said fluorocarbon polymer being selected from the group consisting of (a) homopolymers of trifluorochloroethylene, (b) copolymers of trifluorochloroethylene with vinylidene fluoride, and (c) terpolymers of trifluorochloroethylene, vinyldene fluoride and tetrafluoroethylene which comprises positioning the said epoxy adhesive upon said fluorocarbon and maintaining the resultant assembly at a temperature within the range of 20–220° C. for a time period within the range of ½ to 24 hours.

2. The method in accordance with the procedure of claim 1 wherein said epoxy adhesive evidences a surface tension less than 35 dynes/cm.

3. The method in accordance with the procedure of claim 2 wherein said epoxy adhesive comprises a mixture of the diglycidyl ether of bisphenol A and diethylaminopropylamine.

4. The method in accordance with the procedure of claim 3 wherein said fluorocarbon is a homopolymer of trifluorochloroethylene.

5. The method in accordance with the procedure of claim 3 wherein said fluorocarbon is a copolymer of trifluorochloroethylene with vinylidene fluoride.

6. The method in accordance with the procedure of claim 4 wherein the said assembly is maintained at a temperature within the range of 60–92° C.

7. The method in accordance with the procedure of claim 5 wherein the said assembly is maintained at a temperature within the range of 50–80° C.

8. The method in accordance with the procedure of claim 6 wherein the said assembly is maintained at a temperature within the range of 72–88° C.

9. The method in accordance with the procedure of claim 7 wherein the said assembly is maintained at a temperature within the range of 52–74° C.

10. An article comprising an epoxy adhesive rigidly bonded directly to a fluorocarbon polymer having an unmodified surface, the said polymer being selected from the group consisting of (a) homopolymers of trifluorochloroethylene, (b) copolymers of trifluorochloroethylene with vinylidene fluoride, and (c) terpolymers of trifluorochloroethylene, vinylidene fluoride and tetrafluoroethylene.

11. An article in accordance with claim 10 wherein said epoxy adhesive comprises the reaction product of the diglycidyl ether of bisphenol A and diethylaminopropylamine.

12. An article in accordance with claim 11 wherein said fluorocarbon is a homopolymer of trifluorochloroethylene.

13. An article in accordance with claim 11 wherein said fluorocarbon is a copolymer of trifluorochloroethylene with vinylidene fluoride.

References Cited

UNITED STATES PATENTS

| | | | |
|---|---|---|---|
| 2,809,130 | 10/1957 | Rappaport | 161—189 X |
| 3,023,189 | 2/1962 | Jupa | 161—189 X |
| 3,198,691 | 8/1965 | Thomas et al. | 161—189 X |
| 3,231,460 | 1/1966 | Andrews | 156—333 X |

EARL M. BERGERT, *Primary Examiner.*

HAROLD ANSHER, *Examiner.*